Sept. 10, 1968 C. W. HAINES 3,400,558
LOW FRICTION SLIDING AND TORQUE TRANSMITTING CONNECTION
Filed April 9, 1965 5 Sheets-Sheet 1

INVENTOR.
CHARLES W. HAINES
BY
ATTORNEYS

Sept. 10, 1968 C. W. HAINES 3,400,558
LOW FRICTION SLIDING AND TORQUE TRANSMITTING CONNECTION
Filed April 9, 1965 5 Sheets-Sheet 2

INVENTOR.
CHARLES W. HAINES
BY
ATTORNEYS

Sept. 10, 1968 C. W. HAINES 3,400,558
LOW FRICTION SLIDING AND TORQUE TRANSMITTING CONNECTION
Filed April 9, 1965 5 Sheets-Sheet 3

INVENTOR.
CHARLES W. HAINES
BY
ATTORNEYS

Sept. 10, 1968      C. W. HAINES      3,400,558

LOW FRICTION SLIDING AND TORQUE TRANSMITTING CONNECTION

Filed April 9, 1965      5 Sheets-Sheet 4

INVENTOR.
CHARLES W. HAINES
BY *Walter E. Parlick*
*Harold D. Hall*
*Peter Vrahotes*
ATTORNEYS

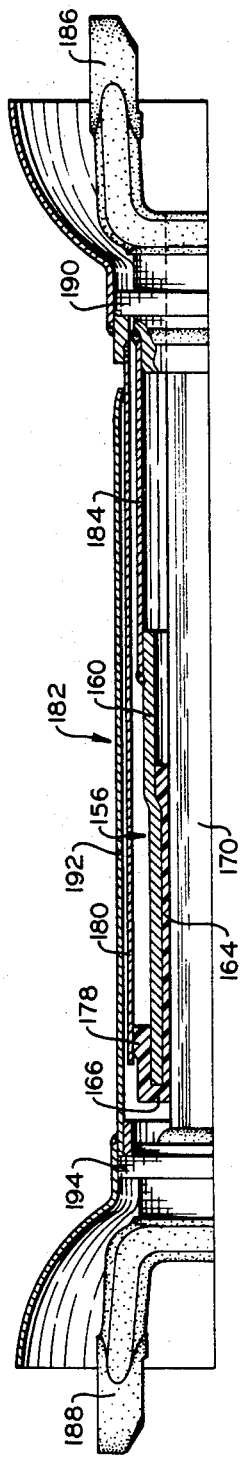
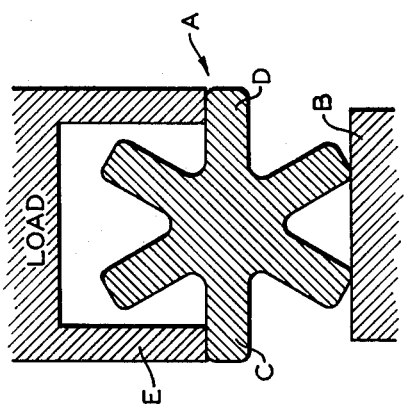

United States Patent Office 3,400,558
Patented Sept. 10, 1968

3,400,558
LOW FRICTION SLIDING AND TORQUE
TRANSMITTING CONNECTION
Charles W. Haines, Toledo, Ohio, assignor to Dana
Corporation, Toledo, Ohio, a corporation of Virginia
Filed Apr. 9, 1965, Ser. No. 447,041
25 Claims. (Cl. 64—23)

This invention relates to improvements in torque transmitting sliding connections in general and more particularly to providing a slidable torque transmitting connection or slip joint between a pair of telecopically related shafts, which connection has at least a portion thereof made from a relatively hard plastic material having a low coefficient of friction and high wear and scuff resistant characteristics.

While slip joints have been known and utilized for many years, as for example in vehicle driveline arrangements, the commercial applications of such joints because of the relative small size and high torsional load requirements have been limited to slip joints wherein the outer or female member and the inner or male member are made entirely of metal and have mating acircular portions such as mating splines. These mating spline portions, especially while transmitting a torsional load, exhibit a substantial resistance to slip during telescopic movement even when the best available lubricants are utilized therewith; which resistance is not only objectionable from a mechanical efficiency and wear standpoint, but is also highly objectionable in that an undesirable amount of noise is produced during telescopic movement.

Many attempts have been made to facilitate the telescopic action of these metallic members as by utilizing various anti-friction bearings between the mating portions of the outer and inner members; however, such solutions, while accomplishing the desired objective, are very expensive and result in the handling, storing and utilization of a great multitude of components and, furthermore, require highly exacting machining practices to provide satisfactory mating tolerances. Attempts have also been made to improve the frictional characteristics of the mating surfaces by treatments such as chrome plating or acid phosphate etching. These surface treatments not only do not reduce friction to a satisfactory level, but also provide surfaces which still have a tendency to be easily scuffed, worn or otherwise damaged and additionally are relatively expensive for the degree of benefits obtained.

It has been noted in several prior art patents that plastic materials have been utilized in coupling devices. One such patent, United States Patent No. 2,924,954, discloses an internally splined plastic outer member which receives cooperatively splined portions of a pair of externally splined inner members disposed therein. However, such a device neither contemplates nor is directed toward utilizing the plastic member as a friction reducing portion during telescopic movement, and further, the plastic portion is expressly arranged to deform, such as by ovalization, during torque transfer; which deformation would be highly detrimental to telescoping.

Another prior art device, such as shown in United States Patent No. 2,199,926, provides a member telescopically receiving an inner member disposed therein with a relatively soft resilient rubber cushion bonded to the outer surface of the inner shaft. However, the rubber cushion as described was not contemplated nor does it provide a low friction coupling between the inner and outer members, but rather, was introduced to provide a cushion acting in compression to dampen torsional vibration. In fact, the relatively soft resilient cushion described in this patent would no doubt be frictionally detrimental to telescoping of the members because of its coefficient of friction and also detrimental because of excessive deflection under torsional loads.

Yet another prior art construction, as shown in United States Patent No. 2,971,356, discloses a splined hub made from polyurethane plastic and adapted to connect a shaft to a clutch in a flexible manner. It is noted, however, that the structure contemplated by this patent was no directed to providing a low friction connection between telescopically related members but rather merely to provide for a flexible and dampened transmission of torque therebetween. Flexibility is provided for by both the shape of the polyurethane hub and the fact that the poryurethane is not surrounded by a member in such a manner that it is prevented from geometric deformation.

Accordingly, it is an object of this invention to provide a torque transferring slip connection for a pair of telescopically related shafts which connection has low friction and high wear and scuff resistant characteristics.

It is another object of this invention to provide telescopically related shafts having noncircular mating portions, when viewed in cross-section, cooperative to transmit torsional loads therebetween while accommodating telescopic movement, wherein at least one of the mating portions is made from a relatively hard plastic material having a low coefficient of friction and being capable of transmitting a substantially high torsional load.

It is yet another object of this invention to provide a slip connection wherein at least a portion of the outer member is in the form of a hollow tube having an inner mating portion attached thereto in such a manner as to inhibit relative axial and rotative movement therebetween, and adapted to slidingly engage a cooperating mating portion on an inner member, which outer mating portion is made from a plastic material comprised of urethane.

It is yet another object of this invention to provide such a plastic mating portion which is loaded substantially in shear when torsional loads are transmitted between the inner and outer members of the slip connection.

Other and further objects of this invention will become apparent upon a consideration of the specification when taken in view of the following drawings, wherein:

FIG. 10 is a fragmentary view partially in section of a driveline assembly utilizing the embodiment of this invention shown in FIG. 8; and FIG. 11 is an elevational view of a test sample utilized to determine certain physical characteristics of the plastics utilized in this invention.

Figure 1:
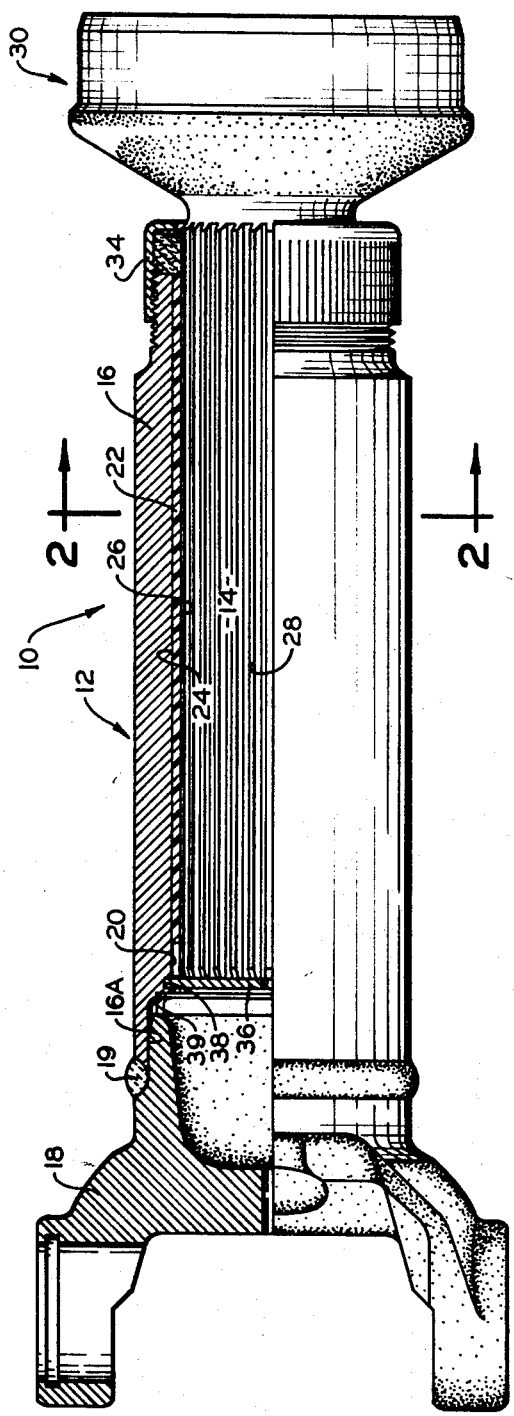
FIG. 1 is a longitudinal view of a portion of a driveline incorporating a slip connection of this invention with a portion thereof shown in sections.

In a preferred embodiment of this invention, which, as shown in the drawings, has been adapted for utilization in the driveline of a motor vehicle, the outer member of a slip connection comprises a hollow elongated tubular portion having a plastic element bonded therein; which outer member telescopically receives an elongated inner member having a noncircular shaped periphery when viewed in cross section, that is, it is externally splined. The plastic element is comprised of urethane having its inner surface of spline form to cooperate with and slidably receive the splined inner member. In actually producing the outer member, it has been found that a mold incorporating a male splined portion having substantially the exact dimensions of the inner member can be utilized. This results from the fact that the preferred plastic utilized in casting the plastic portion comprises urethane which, when the portion is dimensioned as hereinafter described, displays an extremely small shrinkage factor so that the cured plastic portion will closely conform to the mating inner member.

In view of the close conforming qualities of this portion when produced in the manner hereinafter described and in addition to the other qualities thereof, the slip connections of this invention are also ideally suitable for other applications requiring telescoping under torsional loads in addition to the driveline applications shown in the drawings. One such application contemplates incorporating such a slip connection as the telescoping member in a variable length vehicle steering column. Substantially no backlash can be tolerated in such an application and the close conforming characteristics of this invention substantially eliminates backlash while providing free telescopic movement.

It has been found that, in order to transmit high torsional loads while still functioning to telescope relatively freely, the plastic portion of the outer member must be inhibited from assuming a distorted geometry under load, since even if the plastic portion has a low coefficient of friction, if it deforms excessively it will inhibit free telescoping. To this end, the preferred plastics are relatively stiff and a tubular portion of the outer member has been provided for the full length or substantially the full length of the torque transferring plastic portion and has a substantial radial thickness and torsional strength since the torsional loads from the inner member are transmitted thereto by the plastic portion.

Additionally, when the inner member has a splined periphery so that the inner surface of the plastic portion assumes a cooperating splined configuration, it has been found that the root portion of the plastic spline, comprised of the plastic circumferentially between adjoining splines (that is, the area disposed between the major internal diameter and the external diameter of the plastic portion), is preferably maintained with a radial thickness of from .020–.100 inch. The minimum of .020 inch is maintained to insure that the plastic material, when being cast, can reach its proper position between the inner wall of the tube and the male mold element, and to provide a complete peripheral bond between the plastic portion and the tube. The .100 inch maximum root thickness has been found highly desirable to maintain the shrinkage of the plastic material to a minimum so that it can be cast substantially to the size of the mating inner member and when subsequently cured, will not shrink excessively. The above recited maximum root thickness also insures that the curing shrinkage will be limited sufficiently so that the plastic portion will not pull away from the tube. To additionally insure that the shrinkage factor will be minimized, it has been found that the radial thickness of the spline portion of the plastic material (the area between the minor inner diameter and the outer diameter of the plastic portion) preferably be maintained at a ratio of 2:1 with respect to the thickness of the root; however, spline thickness having a ratio as great as 5:1 with respect to the root have also been found to give satisfactory shrinkage results. When certain fillers as hereinafter described are included in the plastic, ratios as high as 10:1 can be utilized without excessive shrinkage results. It should also be noted, where shrinkage is not an important factor between the tube and the plastic portion that the plastic portion may be made to ratios and thicknesses other than described above and the portion of the plastic cooperating with the inner member can be cast over-size and during the curing operation shrink to the desired size.

In another embodiment of this invention, the plastic portion is provided, in addition to the portion within the tubular member, as a coating bonded to at least a portion of the periphery of the tubular member so as to provide a low friction seal engaging surface on such periphery and also to insure that complete plastic insulation is provided between the outer member and the inner member, and any associated elements, telescopically related thereto.

In other embodiments of this invention the external surface of the inner member and the internal surface of the plastic portion are shown with noncircular cross-sections other than spline shapes, and in one such embodiment the plastic portion is shown mechanically secured to the tubular portion instead of being bonded thereto.

It has been found that, in the above described embodiments, the material preferred for utilization as the plastic portion comprises an unfilled polyurethane plastic having a Shore type D durometer hardness in the general range of 65 to 90, a minimum tensile strength of about 5,000 p.s.i. and a dynamic coefficient of friction of approximately 0.35. Such a plastic has been found to give very dramatic low deflection and low friction telescoping performance even when subjected to substantially high torsional loads, which performance is far superior to results obtained with prior art metal to metal (with and without lubrication) sliding engagement under similar conditions.

One polyurethane plastic which was found to have the above characteristics and function in the desired manner was obtained by utilizing a urethane polymer sold commercially by E. I. du Pont de Nemours & Co. and identified by the trademark Adiprene L–315. This is a fully saturated liquid polyether type urethane polymer having substantially high isocyanate content and, when cured with the proper curing agent, is characterized by high heat deflection temperatures, high abrasion and impact resistance, high tensile strength, relatively low coefficient of friction and suitable hardness.

Many aromatic diamines function satisfactorily as the curing agent for the Adiprene L–315; however, it has been found that most satisfactory results are obtained with 4,4'-methylene - bis - (2-chloroaniline) commercially available as a product sold by E. I. du Pont de Nemours & Co. under the trademark Moca, since it combines workable pot life with excellent vulcanizate properties. Adiprene L–315 when cured with Moca jells in less than 1½ minutes, while with other aromatic diamine curing agents, the jelling time is too rapid for use in casting which is the preferred method of obtaining the embodiments of this invention.

The high concentrations of fillers required to produce hard products with other elastomers are not needed with Adiprene L–315, since the unfilled plastic itself is relatively hard and will perform entirely satisfactorily in the various embodiments of this invention without the addition of any fillers. Adiprene L–315 requires 29 parts of Moca per 100 parts of the Adiprene resin (parts per hundred of resin or pphr.) for complete reaction. However, the best balance of properties was obtained by utilizing 26 pphr. of Moca, for as Moca concentration is reduced from 29 to 26 pphr., tensile strength, impact resistance and stiffness increase while there is little change in the other measured properties. Another polyurethane plastic which was tested and gave satisfactory results was Cyanaprene D–7, a polyester based resin sold commercially by American Cyanamid; such resin being cured by utilizing Moca and having physical characteristics, as far as this invention is concerned, substantially the same as the Adiprene L–315.

Figure 2:
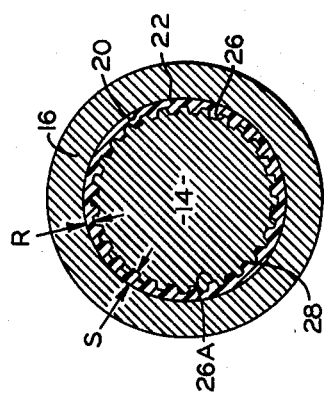
FIG. 2 is a cross section view of a slip connection embodying this invention taken along the lines 2—2 in FIG. 1.

Referring to the drawings, and particularly to FIGS. 1 and 2, a slip connection according to this invention is shown generally at 10 and includes an outer 12 which telescopically receives an inner shaft 14 in a sliding and torque transferring relationship. The outer shaft 12 comprises an axially elongated hollow tubular portion 16 having a counterbore 16A in the left end thereof into which a cooperating portion of a yoke member 18 is pressed and suitably secured as by a circumferential weld 19; which yoke member forms one of the articulating members of a universal joint.

The tubular portion 16 is cylindrical in form and has an inner surface 20 defining a central opening extending axially therethrough, and intimately secured as by bonding to the surface 20 is an axially elongated plastic portion 22, the periphery 24 thereof lying entirely within and conforming to the surface 20. The plastic portion 22 is provided with a noncircular opening therein, that is, it is formed with an internal splined surface 26 for sliding and torque transferring cooperating with the peripheral a circular or splined surface 28 of the axially elongated inner member 14. When using the term "plastic" herein as relating to the portion 22, such includes a plastics having the preferred physical properties hereinbefore defined and such as urethane and such urethane plastics when filled as hereinafter described.

The right end of the inner member 14 is enlarged and provided with an attaching portion 30 for conventional attachment to a driveline member (not shown). A sealing means 34 is threadedly secured to the periphery of the tubular portion 16 at the right end thereof and slidingly engages the periphery of the inner shaft 14 to prevent the entrance of contaminants between the inner and outer shafts 12 and 14 and to inhibit the egress of lubricant therepast in the event the lubricant is utilized between the inner and outer members. A centrally apertured annular disk or Welch plug 36 is secured in a groove 38 formed in the left end of the inner surface 20 of the tubular member 16 so as to suitably seal the left end of the central opening 20 in the outer member 12.

The splined surface 26 of the plastic portion 22 is substantially uniform in cross section throughout its length and comprises a plurality of circumferentially spaced longitudinally extending splines 26A and is of substantially greater axial length than the radial extent or major diameter thereof. The radial thickness of the splines 26A is indicated by the letter S, and as shown, is approximately .125 inch. The radial thickness of the plastic portion intermediate the splines 26A, hereinafter referred to as the root area of the spline, is indicated by the letter R, and, as shown, is approximately .062 inch, so that the ratio of the spline thickness to the root thickness is approximately 2:1 and the root thickness is within the preferred .020–.100 inch range.

The thickness S of the splines 26A is preferably maintained at a ratio of approximately 2:1 with respect to the thickness of the root R; however, ratios as high as 5:1 have been utilized with unfilled urethane plastic and satisfactory results obtained. When the urethane plastic is filled as hereinafter described, ratios as high as 10:1 have been utilized with satisfactory results since the shrinkage factor of the filled urethane is approximately one-half that of the nonfilled urethane and the thermal coefficient of expansion is substantially less (thermal dimension stability is increased), additionally, the hardness and stiffness is increased.

As previously described, the thickness of the root R and the ratio of the spline thicknesses to root thickness is maintained within the preferred ratios to insure that excessive shrinkage of the plastic portion 22 does not occur during the curing of the cast plastic portion, which shrinkage would effect the dimensions of the plastic portion and the bond between the same and the tubular member 16, and so that, in the operation of the slip connection 10, the difference in coefficient of expansion of the metallic tubular portion 16 and the plastic portion 22 does not cause undue stress to arise and perhaps separation of the bond between the tubular and plastic portions.

A root thickness R less than 0.20 inch may be utilized, but is less desirable since it is difficult to successfully cast the plastic portion 22 in such thinner areas while still insuring a uniform casting and a uniform peripheral bond between the plastic portion and the tubular portion 16. Root thicknesses R substantially greater than approximately .100 inch are less desirable with the nonfilled urethane plastic since such a larger volume of plastic, when cast into the tubular portion and cured, due to the shrinkage factor thereof, will tend to shrink away from the tubular portion 16 and interfere with the bond therebetween and also tend to shrink away from the cooperating splined surface 28 of the inner member 14 resulting in a poor fit therewith and also results in the undesirable thermal expansion problems discussed above. While the shrinkage relative to the spline 28 of the inner member 14 can be substantially provided for by casting oversize and shrinking to size, such is not the case for the relationship of the plastic portion with the tubular portion 16 when the plastic portion is cast within and bonded and cured to the tubular portion for in such a case the plastic cannot be cast oversize and allowed to shrink excessively.

Since the shrinkage factor has been found to be approximately one-half and the thermal coefficient of expansion is substantially less when comparing certain filled urethane plastics to the unfilled urethane, with such filled urethane plastics the maximum root thickness can be as great as approximately .200 inch without detrimentally affecting the dimensions of the root and the bond between the same and the tubular portion 16.

As seen in FIG. 2, the spline portion 28 of the inner member 14 is substantially uniform in cross section throughout its length and cooperates with the splines 26A of the plastic portion 22 in such a manner that, when torque is transmitted therebetween, the splines 26A are subjected substantially entirely to shear type loads. It being understood that the number of cooperating splines is selected for convenience and, for example, it is contemplated that the plastic portion can have one or more spline forming grooves therein and the inner member have a like number of splines projecting into the grooves. Since the plastic portion 22 is made from the preferred plastic having the desired physical properties and is entirely circumferentially surrounded and supported by the tubular portion 16, little change in the geometry of the plastic portion 22 occurs; which, combined with a low coefficient of friction of the preferred plastics, results in low friction telescoping of the slip connection 10 even when subjected to substantial torsional load. It should be noted that not only does the tubular portion 16 inhibit geometry changes of the plastic portion 22, but also that the entire torsional load transmitted by the slip connection 10 is transmitted through the plastic portion to the tubular portion.

Figure 3:
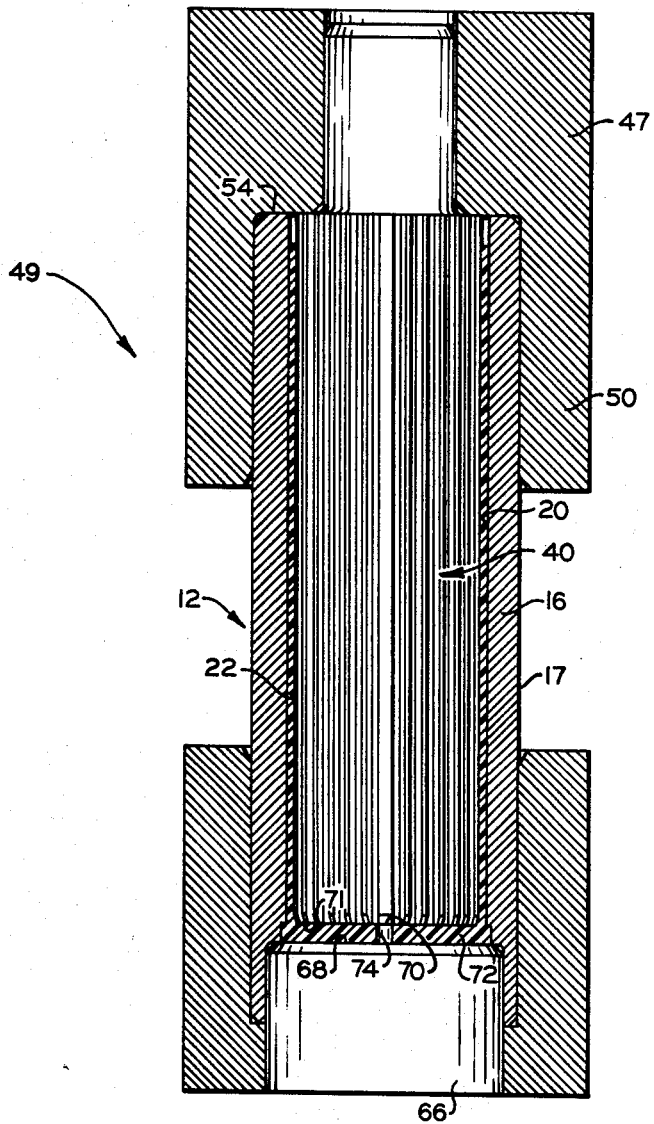
FIG. 3 shows a modified embodiment of an outer member of a slip connection according to this invention, which member is shown in a mold in which it can be prepared.

The plastic portion 22 is preferably provided in the tubular portion 16 by casting the same therein; however, the plastic portion may be formed separately from the tubular portion and inserted thereinto and bonded thereto. Further, as seen in FIG. 3, a urethane plastic Welch plug 72 can be formed integrally with the splined plastic portion 22, which plug blocks the inner end of the opening 20 in the tubular member 16 of the outer member 12. The Welch plug is preferably provided with a central breathing aperture 74, the aperture 74 having been formed by a projection 70 extending upwardly from the end face 68 of a plug 66 of a mold assembly 49. The mold assembly also includes a base 47 which engages the end 54 of the tubular member and having a flange 50 thereon engaging the periphery 17 of the tubular portion 16, and a peripherally splined male mold 40 having an inner end 71 which engages the projection 70 so as to provide a space for the plug 72.

Figure 4:
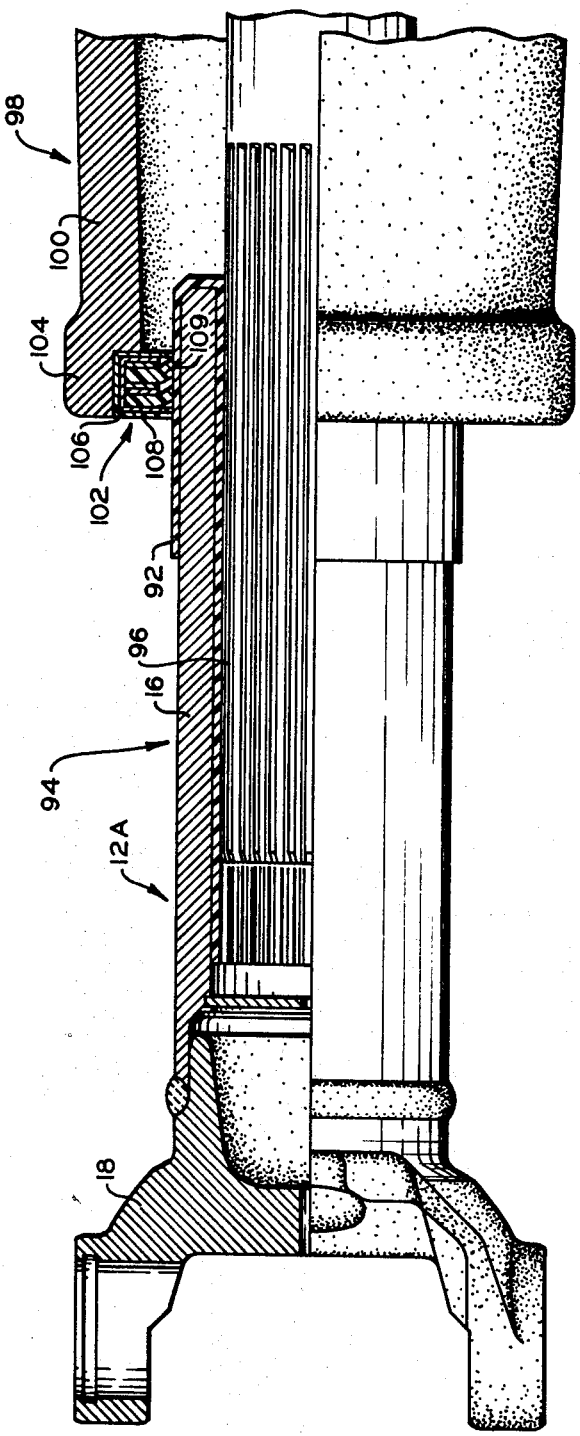
FIG. 4 is a longitudinal cross section view showing another embodiment of this invention utilized to drivingly and telescopically connect a vehicle driveline to the shaft of a mechanical device having a housing.

FIG. 4 discloses a slip joint 94 and wherein the splined inner shaft 96 is a shaft rotatably associated with a mechanical device 98 having a stationary housing 100. If, for example, the device 98 is a mechanical transmission, it is highly desirable to have a sliding and rotating seal, as shown generally at 102, between the stationary housing and the relatively rotating and telescoping outer shaft 94, which seal is operable to inhibit the entrance of contaminants into the housing and to prevent the egress of lubricants therefrom.

More particularly, the housing 100 has an annular portion 104 overlying the shaft 96 and radially spaced from the periphery of the outer shaft 12A, which portion 104 is provided with a counterbore 106 at the open end thereof. Securedly pressed into the counterbore 106 is an annular lip seal 108 having an inner surface 109 adapted to slidably and rotatably engage the peripheral plastic coating 92 thereby sealing the opening between the annular portion 104 and the shaft 12A in a low friction relationship.

Another important feature of utilizing the outer member 12A is that, with the plastic material bonded thereto both internally and externally, the outer shaft 12A effectively isolates the tubular portion 16 thereof and the portion of the driveline (not shown) pivotally connected to the yoke member secured thereto, both from transmitting to or receiving from the device 98 any electrical currents, since the preferred plastic material urethane utilized for this invention has high insulating qualities, and also tends to dampen the transmission of vibration therebetween.

The seal 108 as shown is a lip seal and, because of the physical characteristics hereinbefore described with respect to the preferred plastic, the engagement of the lip seal with the plastic 92 results in extremely low friction relative slip and rotation therebetween. Because of this low friction quality, the seal is extremely long wearing and efficient. Further, in the prior art type of arrangements, wherein the periphery of the slip shaft is of ground metal material cooperating with a flexible lip seal, the periphery of the metallic shaft has to be ground and subsequent to such grinding requires extreme care in handling and storing so as not to damage the ground surface or allow the same to corrode. Also, once the same is put into service use, the ground surface is subjected to inadvertent blows, causing nicks, and the action of the elements, resulting in corrosion, tending to shorten the useful life thereof. Whereas, with the plastic coating 92, such is not the case. The surface of the shaft need not be carefully ground, since it is not an engaging surface but is merely cleaned and has the plastic portion 92 bonded thereto, and less care can be exercised in handling since the hard and tough plastic coating is not easily damaged, nor does it corrode, and in service use the plastic coating is substantially uneffected by the action of the elements.

Figure 5:
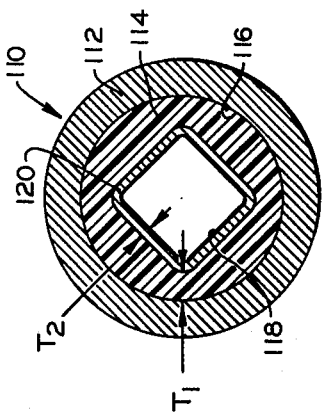
FIG. 5 is a cross sectional view, taken in the manner similar to FIG. 2, of another embodiment of this invention.

Referring now to FIG. 5, wherein a cross sectional view of another embodiment of this invention is disclosed, the outer member 110 of the slip joint includes a tubular portion 112 and a plastic portion 114 intimately secured to the inner surface 116 thereof. As shown, the tubular portion 112 is cylindrical in shape; however, noncylindrical configurations may also be utilized. The plastic portion 114, as seen in cross section, is provided with a noncircular or rectangular opening 118 therein, which opening extends uniformly for the full length of the plastic portion and telescopically receives therein an inner member 120 in a torque transferring and sliding relationship. As shown, the inner member 120 has a noncircular or rectangular external configuration and the opening 118 in the plastic portion 114 closely conforms and registers therewith.

As shown, this embodiment contemplates that the plastic portion is prepared from a filled urethane plastic and is dimensioned accordingly. Thus, the minimum thickness of the plastic portion, indicated at $T_1$ is approximately .185 inch, which is within the desired .200 inch hereinbefore referred to when the filled plastic was discussed, while the maximum thickness indicated at $T_2$ is approximately .370 inch or in a ratio of approximately 2:1 with respect to the minimum thickness. When torque is transmitted between the outer and inner members 112 and 120, the plastic portion 114 is subjected to substantial shear type loads and the peripheral geometry thereof is restrained from deforming by the surrounding outer member 112. Accordingly, even when subjected to substantial torisonal loads, as a result of the inhibited deformation and low coefficient of friction of the plastic portion 114, relative telescoping of the outer and inner members 112 and 120 will take place with a low degree of friction.

Figure 6:
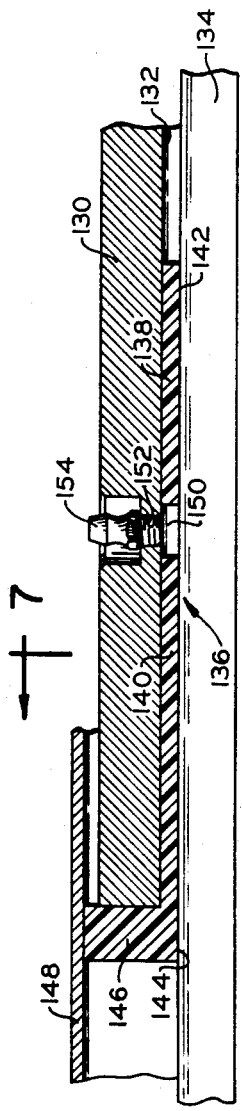
FIG. 6 is a fragmentary longitudinal sectional view of another embodiment of this invention.
Figure 7:
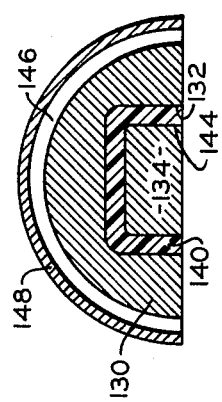
FIG. 7 is a cross sectional view of the embodiment shown in FIG. 6 taken along the lines 7—7 in FIG. 6.

Referring now to FIGS. 6 and 7, wherein another embodiment of this invention is shown, an axially elongated outer member 130 is of tubular form and has a cylindrical periphery and a noncircular or rectangular opening 132 extending axially therethrough. An axially elongated a noncircular or rectangular inner member 134 is disposed in the opening 132 and spaced therefrom and being adapted to telescope therewithin. Disposed between the outer and inner members 130 and 134 is an axially elongated plastic portion shown generally at 136 consisting of axially inner and outer portions 138 and 140.

The portions 138 and 140 are made from a plastic having the desired physical characteristics as hereinbefore defined, and in this embodiment, unlike the previously described embodiments, the portions 138 and 140 are produced separately from the inner and outer members and then positioned in the outer member and bonded thereto with a suitable adhesive. An adhesive which has been found satisfactory to bind the inner and outer portions 138 and 140, when made from urethane, to the outer member 130 is a one part epoxy type adhesive identified as EC 2214 and obtainable commercially from the Minnesota Mining & Manufacturing Company.

The portion 138 has a rectangular periphery conforming to the opening 132 in the outer member 130 and a noncircular or rectangular opening 142 conforming to the periphery of the inner member 134. The portion 140 is of substantially the same shape as the portion 138, having a rectangular periphery conforming to the opening 132 and a rectangular opening 144 therein conforming to the inner member 134, and, additionally, has a flange 146 extending axially and radially outwardly therefrom beyond and abutting the outer end of the outer member 130 where the same acts not only to inhibit relative axial movement but also as a spacing support and low friction bearing surface for an overlying housing or tube 148 for a purpose hereinafter described with reference to FIGS. 8 to 10. The openings 142 and 144 are both substantially smaller in radial extent than the axial length of the plastic portion 136. It is also contemplated that the portion of the opening 144 bounded by the flange 146 may be slightly smaller than the remainder of the opening 144, so that a slight interference sealing fit is experienced between the same and the shaft 134 to inhibit the passage of contaminants and lubricants therepast.

The portions 138 and 140 are axially spaced thereby providing a rectangular chamber 150 lying between the portions and bounded internally by the inner member 134 and externally by the outer member 130. The outer member 130 is provided with a depressed, radially extending and threaded opening 152 confluent with the chamber 150 and a conventional lubricating fitting 154 is threaded into the opening 152 so that lubricant may be supplied to the chamber 150 for lubricating the engagement of the inner member 134 and the portions 138 and 140.

Since the portions 138 and 140 are formed separately from the outer member 130, dimensional tolerances thereon are not limited, as was the case with the previously described embodiments, by shrinkage considerations, since the same may be cast oversized, both externally and internally, as required to obtain the final dimensions after shrinking.

Figure 8:
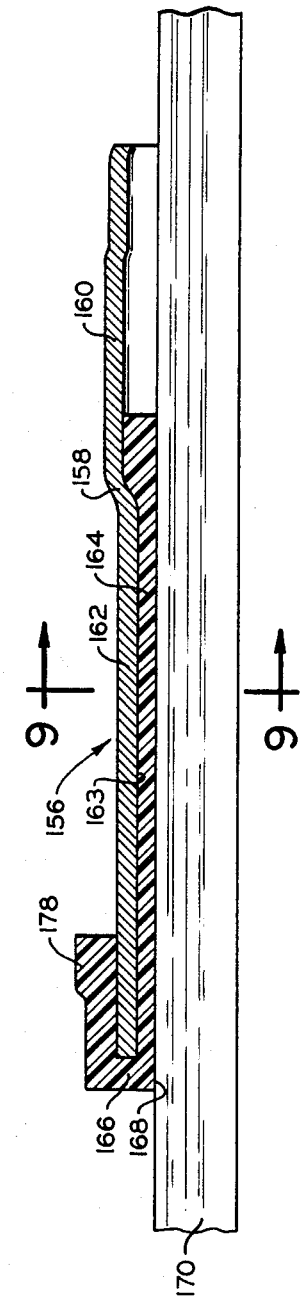
FIG. 8 is a fragmentary longitudinal sectional view of another embodiment of this invention.
Figure 9:
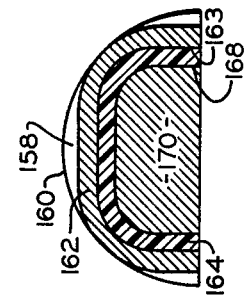
FIG. 9 is a cross sectional view of the embodiment of FIG. 8 taken along the lines 9—9 in FIG. 8.

Referring now to FIGS. 8 to 10, an embodiment of this invention is disclosed wherein the plastic portion need not be bonded to either of the members to retain the same in its position. Great savings can be realized by such a construction in that the cleaning of the outer member for bonding purposes is reduced and the bonding agent need not be applied thereto.

The outer member 156 of this embodiment has a stepped configuration so as to provide a circumferentially extending axially inwardly facing abutment in the form of an axially inwardly facing shoulder 158 between the larger and smaller portions 160 and 162 thereof. As shown, the outer member 156 was made by taking a tubular shaft having the internal and external dimensions of the larger portion 160 and deforming the outer end thereof inwardly to form the smaller portion 162, the latter being of noncircular cross-sectional configuration such as the rectangular configuration shown and having an opening 163 therein which is smaller in cross sectional area than the cross sectional area of opening in the larger portion 160; that is, the average radial extent of the opening 163 is less than the average radial extent of the opening in the portion 160.

An axially elongated plastic portion 164 is cast into the outer member 156 and extends from within the larger portion 160 for the full length of the smaller portion 162 and terminates outwardly of the portion 162 in an annular abutting flange 166.

Since the smaller portion 162 is noncircular, the plastic portion 164 is mechanically locked from rotating relative thereto, that is, the inner walls 163 of the portion 162, which define the noncircular opening therein, provide circumferentially spaced circumferential abutting means which engage the plastic portion 164 and inhibit the relative rotation thereof. Additionally, since the plastic portion extends inwardly of the shoulder 158 and conforms to the inner diameter of the larger portion 160 and extends outwardly of the smaller portion 162 and has the flange 166 extending radially thereof and abutting the outer end of the portion 162 which also serves as an axial abutment, the plastic portion is also mechanically locked against axial movement relative to the outer member; it being understood that other types of axial abutments may be provided on the outer member 156.

The plastic portion 164 is provided with an axially elongated noncircular or rectangular opening 168 of substantially uniform configuration for the entire axial length thereof and having a substantially smaller radial extent, measured diagonally, than the axial length thereof, which opening slidably receives in a torque transferring relationship an axially elongated inner member 170 having at least a portion thereof formed with a noncircular or rectangular axially uniform periphery cooperating with the opening 168. While the opening 163 and the opening 168 are shown with a similar rectangular shape, it is understood that the shapes of the openings need not be similar. The plastic portion 166 also has an annular shoulder 178 formed integrally with the annular flange 166 which shoulder, as clearly seen in FIG. 10, extends peripherally of and abuts the outer member 156 and provides a spacing support and friction reducing bearing for the outer end of a tubular member or housing 180, the latter forming the inner telescoping portion of a shielding means shown generally at 182 which is rotatable relative to the outer member 156. The larger portion 160 of the outer member 156 is securedly attached to one end, as by welding, of a tubular extension 184, while the other end of the tubular extension is secured, as by welding, to a yoke member 186 of a universal joint. The inner member 170 extends axially outwardly of the flange 166 and has a yoke member 188 formed integrally with the outer end thereof. The tubular member 180 is supported for rotation on an annular low friction bearing shoulder 190 carried on the yoke 186 so that the tubular member 180 is supported for rotation by the annular shoulders 178 and 190. A second tubular member 192 is telescopically positioned about the tubular member 180 and adjacent one end thereof and is supported for rotation on a low friction annular bearing shoulder 194 carried on the yoke 188 while the other end thereof slidingly engages the tubular member 180. Accordingly, it is seen that the annular shoulder 178 and the flange 166 can be formed integrally and simultaneously with the plastic portion 164 thereby resulting in an easy and inexpensive construction.

In both the embodiments of FIGS. 6–7 and 8–10, some of the plastic portion, 146 and 166 respectively, is not surrounded by the outer member 130 and 156 respectively. However, these portions 146 and 166 are for purposes other than the transmission of torque, and in both of the embodiments, the torque transferring plastic portions 136 and 164 are surrounded by the outer member as in the first embodiment. Additionally, in the embodiments of FIGS. 6–10, the outer ends of the rectangular openings 144 and 168 are formed with a slightly smaller radial extent, preferably in the general range of .001–.015 inch on each side of its rectangular configuration, than the remainder of the opening, such that an interference fit is present between the outer end of the plastic portions 136 and 164 and the shafts 134 and 170 respectively, which interference fit forms a low friction sliding seal therebetween. Since the outer ends of the plastic portions 136 and 164 are not surrounded by the tubular portions 130 and 162 and primarily since the preferred plastic is elastomeric and has a low coefficient of friction, the interference fit does not interfere with the operation of the slip connections.

The following are the results of some tests run on various slip connections made in accordance with this invention.

Utilizing a slip connection having the inner and outer telescoping members made in a conventional manner, i.e., the inner member made from an induction hardened medium carbon steel, the outer member made from pearlitic malleable iron and, 31 cooperating involute splines on the inner surface of the outer member and on the periphery of the inner member with the splines on the outer member having a major diameter of 1.3675 inches and a minor diameter of 1.264 inches, a comparison was made therewith of like dimensioned slip connections made in accordance with FIGS. 1 and 2 wherein the inner member was identical to the inner member of the conventional slip connection and the plastic portion 22 bonded in the tubular member 16 of one set of test parts that was made from unfilled urethane.

A test was conducted on a slip force test machine wherein the slip connection is reciprocally telescoped while under a torsional load. The machine was adjusted to give a telescoping stroke of ½ inch with a maximum spline engagement of 6¼ inches and a minimum spline engagement of 5¾ inches. Tests were made at torsional loads ranging from 100 lb./ft. up to 1000 lb./ft. (where possible) at 100 lb./ft. increments and the maximum load to extendingly and compressingly telescope the connections were, at each increment, added and recorded; however, some of the samples were not tested at higher torsional loads because the loads necessary to telescope the connections were beyond the capacity of the machine because of excessive frictional resistance to telescoping or chattering occurring as the result of scoring of the engaging surfaces. Three series of tests were run: First, at room temperature with the cooperating splines lubricated with heavy-duty grease; second, at 160 to 180° F. with the cooperating splines lubricated with type A automatic transmission fluid; and third, at room temperature without lubrication. The conventional connection was not tested without lubrication inasmuch as the sample tested with the type A fluid chattered at a torsional load of 100 lb./ft., failure without lubrication was imminent and the test omitted rather than risk damaging the test equipment. The average results of the test, the extension and compression loads for each load incremnet being totaled, are shown below in Table I.

TABLE I.—SLIP FORCE TEST
[Slip force in pounds]

| Torque, lb./ft. | Conventional connection | | | Plastic portion of connection of unfilled urethane | | |
|---|---|---|---|---|---|---|
| | H. D. grease | Type A fluid | No lube | H. D. grease | Type A fluid | No lube |
| 100 | 765 | (¹) | (²) | 680 | 880 | 1,120 |
| 200 | 1,605 | | | 940 | 1,420 | 2,040 |
| 300 | 2,750 | | | 1,380 | 1,720 | 3,000 |
| 400 | 4,260 | | | 1,740 | 2,490 | 3,800 |
| 500 | 5,850 | | | 2,120 | 2,840 | 4,600 |
| 600 | | | | 2,440 | 3,340 | 5,600 |
| 700 | | | | 2,860 | 3,910 | |
| 800 | | | | 3,170 | 4,560 | |
| 900 | | | | 3,490 | 5,220 | |
| 1,000 | | | | 3,980 | 5,790 | |

¹ Chatter.
² Not tested.

The results in Table I above clearly indicate that the test sample having the unfilled urethane plastic portion 22, even when not lubricated, is superior to the conventional sample when conventionally lubricated with heavy-duty grease; the unfilled plastic sample giving a slip force load of 5600 lbs. at a torsional load of 600 lb./ft. while the conventional connection gave a slip force load of 5850 lbs. at a torsional load of 500 lb./ft., and when lubricated, the unfilled plastic sample at a torsional load of 1000 lb./ft. gave a slip force load of 3980 lbs. which was lower than the lubricated conventional sample at a torsional load of 400 lb./ft., that is, superior in a ratio of over 2½:1. Further, when tested with type A transmission fluid, the conventional connection chattered so severely that it was unacceptable at a torsional load of only 100 lb./ft.

A test similar to the above was conducted with a slip connection made in accordance with FIG. 9, the inner member being made in a conventional manner from a legth of cold rolled steel material of 1 inch x 1⅛ inch recatngular corss section. A conventional steel outer member was compared to an outer member made in accordance with FIG. 9 wherein the plastic portion was made from unifilled urethane and had an opening within the same cooperatively receiving the steel inner member. The test was again conducted on the slip force test machine and were made at torsional loads ranging from 100 lb./ft. to 1000 lb./ft. (where possible) at 100 lb./ft. increments and the maximum load to extendingly and compressingly telescope the connections ½ inch were, at each increment, added and recorded; however, the conventional sample was not tested at the higher torsional loads because the load necessary to telescope the connection was beyond the capacity of the machine. In these tests, both samples were conventionally lubricated with heavy-duty grease, and the results are shown in Table II below.

TABLE II.—SLIP FORCE TEST
[Slip force in pounds]

| Torque, lb./ft. | Conventional connection | Plastic portion of connection of unfilled urethane |
|---|---|---|
| 100 | 400 | 200 |
| 200 | 680 | 400 |
| 300 | 1,020 | 600 |
| 400 | 1,640 | 810 |
| 500 | 2,100 | 1,020 |
| 600 | | 1,200 |
| 700 | | 1,380 |
| 800 | | 1,560 |
| 900 | | 1,620 |
| 1,000 | | 1,920 |

From a consideration of Table II above it is readily apparent that the sample having the outer member provided with a plastic portion made from unfilled urethane gave results which were far superior to the conventional connection, in fact the results were even superior to a ratio of 2:1.

Life wear tests were also run on samples made in accordance with those reported in Table II above. The tests were conducted on the same slip force test machine with a constant 250 lb./ft. torsional load applied to the connection, the parts were telescoped ½ inch at 52 cycles per minute; a cycle consisting of an extension and compression stroke. The results are reported in the following Table III.

TABLE III.—LIFE WEAR TEST

| Sample | Cycles | Remarks |
|---|---|---|
| Conventional steel connection. | 780 | Failure—Both inner and outer member severely galled. |
| Plastic portion of connection of unfilled urethane. | 236,232 | Test discontinued—Both inner and outer members are still satisfactory. |

The results of the above tests conclusively show that the connection having a plastic portion made from unfilled urethane is far superior regarding life wear than the conventional steel connection; the conventional connection having failed at 780 cycles while the connection having the urethane portion was still satisfactory after 236,232 cycles. In fact, the physical appearance of both the shaft and the urethane portion after the completion of the test showed a desirable highly polished surface on both the shaft and the plastic portion. Static torque and reverse cyclic fatigue tests were also performed on the connection having the plastic portion made from both filled and unfilled urethane, such being installed in a conventional driveline installation, and in every test the sample failed at a location other than the plastic portion.

As previously discussed, the high concentrations of fillers are not required to produce hard products with urethane, since the unfilled plastic itself can be formulated and processed to be relatively hard and perform in an entirely satisfactory manner in the various embodiments of this invention without the addition of any fillers. However, in an effort to modify certain physical characteristics of the plastic, certain fillers were added thereto with beneficial results. It has been discussed above, regarding the embodiments of this invention as shown in FIGS. 1-4, that shrinkage of the plastic material should be held to a minimum so that the plastic can be cast substantially to the size of the mating member and when subsequently cured will not shrink excessively.

One filler which was found to dramatically reduce the shrinking of the plastic was glass fibers of relatively short length. The glass fillers utilized ranged in length from 1/32 inch to approximately ⅙ inch in length. This material was purchased from the Owens-Corning Fiber Glass Corporation and was indicated as being surface treated with Silane A-1100; the latter being a silicone product which results in excellent bonding between the urethane plastic and the glass fibers. The introduction of these glass fibers to the resin before the addition of the curing agent was found to produce a plastic urethane having markedly reduced shrinkage and thermal expansion, and increased temperature resistance, hardness and stiffness. When utilized in amounts up to 40 parts per hundred of the plastic resin (pphr.), the uncured liquid plastic mixtures were still pourable and when cured displayed the following physical characteristics; hardness of 76–81 Shore D, tensile strength of 5000 p.s.i. and elongation at break of 150%. With the glass fiber filled plastic, the minimum spline root thickness of the plastic portion of .020 inch may still be maintained if desired while the maximum root thickness can be increased from .100 inch to .200 inch and the ratio of the spline thickness with respect to the thickness of the root can be increased to as high as 10:1 without excessive shrinkage results.

Additionally, in an effort to further increase the beneficial results of the slip joints of this invention with respect to free telescoping action by increasing the hardness and stiffness of the urethane plastic, fillers such as graphite, Teflon, and molybdenum disulfide (all in finely divided powder form) and/or glass fibers were introduced to the urethane plastic and it was found that the resistance to telescoping of slip connections utilizing such filled plastics, that is the slip force necessary to cause telescoping, was lower. While the various fillers may increase the hardness and stiffness of the urethane plastic, certain other physical properties of the unfilled plastic were reduced, such as tear strength, tensile strength and elongation; however, these latter physical properties, when the amounts of such fillers are limited, are not changed to the point where they are detrimental for the purposes of this invention. For example, utilizing an Adiprene L–315 urethane plastic which, when unfilled had a hardness of 72 Shore D, a tensile strength of 9400 p.s.i., elongation at break of 265%, a National Bureau of Standards abrasion index of 425%, an ASTM D470 tear of 115 lbs./in. and a coefficient of friction at 100 p.s.i. of 0.36, when 10 pphr. of graphite or 10 pphr. of Teflon was added the following respective physical properties were obtained: a Shore D hardness of 72 and 72, a tensile strength of 6500 p.s.i. and 5000 p.s.i., elongation at break of 180% and 115%, an abrasion index of 365% and 500%, an ASTM D470 tear of 120 and 105 lbs./in. and a coefficient of friction at 100 p.s.i. of 0.51 and 0.25. The fact that the Teflon filled urethane had a lower coefficient of friction than the unfilled urethane and gives better slip connections does not appear significant, for the graphite filled urethane, which has a higher coefficient of friction than the unfilled urethane, also resulted in better slip connections than the unfilled urethane; however, it should be noted that all the unfilled and filled plastics discussed herein have a coefficient of friction which is sufficiently low and result in slip connections far superior to the conventional metallic slip connections.

To this end, urethane having the previously discussed desirable physical properties was utilized in various samples wherein fillers comprised of glass fibers, graphite, Teflon and molybdenum disulfide were introduced, with the filled plastics obtained being within the desired hardness and stiffness range and with the tensile strength, flexure strength, abrasion resistance, tear strength, and elongation being at a satisfactory level and benefits in the free telescoping qualities of the embodiments utilizing the same were realized. These fillers were added to the urethane resin before the addition of the curing agent.

Tests were performed on certain urethane plastics with and without various fillers to determine the relative stiffness and hardness thereof. Referring to FIG. 11, the configuration of the test samples is shown generally at A, and has an actual major diameter of approximately 2 inches and a thickness of ½ inch. These samples were supported on a rigid surface indicated generally at B, and a downward load was applied simultaneously to the upper surface of the opposed horizontal arms C and D. The loads were applied by a tubular member shown sectionally at E, which member was dimensioned so as to engage the outer ¼ inch of the arms being tested. A downward load was applied by the member E, which load was progressively increased at a constant rate and load-deflection curves obtained. The results shown in Table IV below are typical for the samples tested.

TABLE IV

| Sample tested | Hardness Shore D | Maximum load, lbs. | Deflection at maximum load, in. |
|---|---|---|---|
| (1) Adiprene L–315 | 71–73 | ¹ 340 | .235 |
| (2) Adiprene L–315 +7 pphr. graphite. | 71–72 | ¹ 365 | .180 |
| (3) Adiprene L–315+40 pphr. graphite. | 73 | ² 400 | .155 |
| (4) Adiprene L–315+50 pphr. graphite. | 75 | ² 375 | .105 |
| (5) Adiprene L–315+7 pphr. graphite +30 pphr. ⅟₁₆″ fiberglass. | 79–81 | ¹ 570 | .155 |
| (6) Adiprene L–315 +50 pphr. graphite +30 pphr. ⅟₁₆″ fiberglass. | 77–78 | ² 465 | .080 |
| (7) Adiprene L–315 +7 pphr. molybdenum disulfide. | 72–74 | ¹ 330 | .200 |
| (8) Adiprene L–315 +7 pphr. molybdenum disulfide +30 pphr. ⅟₁₆″ fiberglass. | 79–81 | ¹ 635 | .160 |
| (9) Adiprene L–315 +10 pphr. Teflon. | 69–71 | ¹ 335 | .180 |
| (10) Adiprene L–315 +10 pphr. Teflon +30 pphr. ⅟₁₆″ fiberglass. | 72–74 | ¹ 530 | .155 |
| (11) Adiprene L–315 +30 pphr. ⅟₁₆″ fiberglass. | 76–79 | ¹ 590 | .180 |
| (12) Adiprene L–315 +40 pphr. ⅟₃₂″ fiberglass. | 77–81 | ¹ 580 | .163 |
| (13) Cyanaprene D–7 | 73–75 | ¹ 430 | .175 |
| (14) Cyanaprene D–7 +30 pphr. ⅟₁₆″ fiberglass. | 79–81 | ¹ 630 | .160 |

¹ At yield point.
² Broke before yielding

It should be noted that the maximum load obtained with the Adiprene L–315 alone (Sample 1) was 340 pounds at a deflection at maximum load of .235 inch and a hardness of 71–73 Shore D, and, with the addition of graphite (Samples 2 and 3), molybdenum disulfide (Sample 7) and Teflon (Sample 9), the maximum load obtained did not change appreciably while the deflection at maximum load was in each case somewhat reduced and the hardness remained substantially the same. With the addition of glass fibers alone to the Adiprene L–315 (Samples 11 and 12) the maximum load and hardness obtained was greatly increased and the deflection at maximum load greatly reduced. With the addition of the glass fibers and graphite (Sample 5), glass fibers and molybdenum disulfide (Sample 7) and glass fibers and Teflon (Sample 10) as compared to the Adiprene L–315, the maximum loads obtained were also greatly increased, the hardness for Samples No. 5 and 8 greatly increased while for Sample 10 (Teflon and glass fibers) the hardness slightly increased and deflection at maximum load decreased. As compared to the glass fiber filled Adiprene (Samples 11 and 12), the deflection at maximum load was reduced and the maximum load and hardness was substantially the same except for the glass fiber and Teflon filled urethane (Sample 10), which was somewhat lower.

As to the Cyanaprene D–7 (Sample 13) and the Cyanaprene D–7 filled with glass fibers (Sample 14) such were somewhat higher in maximum load and lower in deflection at maximum load than the Adiprene L–315 and Adiprene L–315 with glass fibers respectively; however, the results are considered as being in the same general range.

With respect to Samples 3 and 4, wherein higher amounts of the graphite fillers were added, and Sample 6 wherein not only a higher amount of graphite filler was added but also 30 pphr. of ⅟₁₆ inch fiberglass, it is seen that the maximum loads were at the point of failure of the test specimen A (i.e., the arms C and/or D broke), and that the deflection at maximum load decreased as the amount of filler was increased. It is also seen that the hardness of Samples 3 and 4 (40 and 50 pphr. of graphite) increased progressively with respect to Sample 2 (7 pphr. graphite) while Sample 6 (50 pphr. graphite and 30 pphr. fiberglass) was substantially the same as Sample 5 (7 pphr. graphite and 30 pphr. fiberglass). It appears from the above that when excessive amounts of fillers are added, the filled plastic loses many of its elastomeric properties.

Slip force tests were also run on the test machine with other samples made in accordance with the embodiment of FIGS. 1 and 2 to compare the unfilled urethane with various previously discussed fillers. In these samples, the plastic portion 22 was provided with 28 involute splines having a major diameter of 1.376 inches and a minor diameter of 1.2435 inches and was of three inch axial length, while the inner member was of conventional form, that is, made from induction hardened medium carbon steel and having a splined periphery dimensioned to cooperate with the internal splines of the plastic portion and of an axial length sufficiently greater than the plastic portion so that a full three inch spline engagement was always present. As in the tests reported above regarding Table I, the test machine telescoped the inner and outer members with a stroke of ½ inch, tests were made at torsional loads ranging from 100 to 1400 lb./ft. (where possible) at 100 lb./ft. increments, and the load to compressingly and extendingly telescope the connections were, at each increment, added and recorded. All samples were conventionally lubricated with heavy-duty grease.

The following samples were prepared and tested: unfilled urethane, urethane filled with 10 pphr. Teflon, urethane filled with 7 pphr. graphite, urethane filled with 7 pphr. molybdenum disulfide, urethane filled with 30 pphr. 1/16 inch fiber glass, urethane filled with 10 pphr. Teflon and 30 pphr. 1/16 inch fiber glass, urethane filled with 7 pphr. graphite and 30 pphr. 1/16 inch fiber glass and urethane filled with 7 pphr. molybdenum disulfide ($MoS_2$) and 30 pphr. 1/16 inch fiber glass. The results of these tests are shown below in Table V.

While several embodiments of this invention have been shown and described, it is readily apparent that many changes and modifications can be made therein without departing from the scope of this invention as defined in the following claims.

What is claimed is:

1. A torque transmitting slip connection comprising in combination, an outer axially elongated portion having an elongated axially extending opening therein, an axially elongated urethane plastic portion having a Shore type D durometer hardness in the range of 65 to 90 and a minimum tensile strength of about 5000 p.s.i. disposed within the opening in said outer portion with a substantial portion of the plastic portion being disposed within and circumferentially surrounded by said outer portion, means securing said plastic portion to said outer portion against relative axial and rotative movement such that torsional loads may be transferred therebetween while said outer portion surrounding said plastic portion inhibits the external periphery of the plastic portion from deforming in a readially outward direction, said plastic portion having an elongated axially extending noncircular opening therein, and an inner axially elongated member having at least a portion thereof disposed in said noncircular opening and axially slidingly cooperable with and closely conforming thereto in a torque transmitting relationship for telescoping movement relative to said plastic portion and transmitting torque thereto.

2. A slip connection according to claim 1 wherein the opening in said outer portion is substantially circular in cross section, the periphery of said plastic portion is sub-

TABLE V

[Slip Force In Pounds]

| Torque, lb./ft. | Unfilled urethane | Urethane +10 pphr. Teflon | Urethane +7 pphr. graphite | Urethane +7 pphr. $MoS_2$ | Urethane +30 pphr. glass | Urethane +30 pphr. glass and 10 pphr. Teflon | Urethane +30 pphr. glass and 7 pphr. graphite | Urethane +30 pphr. glass and 7 pphr. $MoS_2$ |
|---|---|---|---|---|---|---|---|---|
| 100 | 400 | 360 | 470 | 460 | 380 | 280 | 320 | 400 |
| 200 | 730 | 710 | 925 | 700 | 670 | 560 | 620 | 725 |
| 300 | 1,010 | 1,025 | 1,250 | 950 | 1,025 | 800 | 850 | 925 |
| 400 | 1,300 | 1,250 | 1,525 | 1,250 | 1,300 | 1,125 | 1,000 | 1,125 |
| 500 | 1,575 | 1,500 | 1,775 | 1,450 | 1,500 | 1,300 | 1,200 | 1,300 |
| 600 | 1,825 | 1,750 | 2,025 | 1,675 | 1,700 | 1,425 | 1,400 | 1,475 |
| 700 | 2,200 | 2,100 | 2,300 | 2,000 | 2,000 | 1,600 | 1,550 | 1,675 |
| 800 | 2,600 | 2,450 | 2,700 | 2,300 | 2,300 | 2,000 | 1,800 | 1,750 |
| 900 | 3,000 | 2,900 | 3,100 | 2,700 | 2,625 | 2,350 | 2,100 | 2,100 |
| 1,000 | 3,600 | 3,100 | 3,575 | 3,200 | 2,950 | 2,800 | 2,500 | 2,300 |
| 1,100 | 4,850 | 3,300 | 3,785 | 3,800 | 3,550 | 3,330 | 2,950 | 2,550 |
| 1,200 | | | 4,000 | 4,900 | 3,950 | 3,700 | 3,500 | 3,000 |
| 1,300 | | | | | | 3,750 | 4,200 | 3,500 |
| 1,400 | | | | | | | | 4,200 |

From an inspection of the results shown in Table V it is seen that, while the unfilled urethane in itself is satisfactory for this invention, all the filled urethanes gave superior slip test results when compared to the unfilled urethane; the graphite filled urethane is superior to the molybdenum disulfide filled urethane and the latter in turn is superior to the Teflon filled urethane. It is also seen that the fiber glass filled urethane is superior to the unfilled urethane, while the urethane filled with glass and Teflon, graphite or molybdenum disulfide are superior to both the unfilled urethane and the urethanes filled with only one filler. The results reported in Table IV appear to indicate that the four samples giving the greatest maximum load (Samples 5, 8, 10 and 11 gave maximum loads over 525 pounds; no slip test having been run on a specimen made according to Samples 12 and 14) also performed in the most satisfactory manner in the slip test; that is, the samples filled with 30 pphr. glass fibers alone and the samples filled with 30 pphr. glass fibers and 7 pphr. graphite, 7 pphr. $MoS_2$ or 10 pphr. Teflon.

While only filled urethanes including the above mentioned fillers have been tested, it is contemplated that many other fillers can be utilized to improve over the performance noted for the unfilled urethane, however, it should be noted that as previously discussed, unfilled urethane having the hereinbefore noted physical properties performed satisfactorily and in a manner far superior to the conventional metallic slip connections.

stantially circular in cross section and dimensioned so as to closely conform to the opening in said outer portion and means securely bonds said plastic portion to said outer portion within the opening thereof.

3. A slip connection according to claim 1 wherein said urethane is filled with a stiffening filler from a group consisting of Teflon, graphite, fiber glass and molybdenum disulfide, the contents and particle size of the filler being such that the uncured liquid plastic is castable.

4. A torque transmitting slip connection comprising in combination, an outer axially elongated tubular portion having an elongated axially extending opening therein with the axial length of said opening being substantially greater than the radial extent thereof, an axially elongated plastic portion disposed within the opening in said outer portion and comprised of urethane having a Shore type D durometer hardness in the range of 65 to 90 and a minimum tensile strength of about 5000 p.s.i., said plastic portion being disposed within and circumferentially surrounded by said outer portion, means securing said plastic portion to said outer portion against relative axial and rotative movement such that torsional loads may be transmitted therebetween while said outer portion surrounding said plastic portion inhibits the same from deforming in a radially outward direction, said plastic portion having an elongated axially extending noncircular opening therein, said noncircular opening having an axial length substantially greater than the radial extent thereof, and an inner axially elongated member having at least a portion thereof disposed in said noncircular opening and closely conforming thereto such that torsional loads may be transmitted between said inner and outer portions through said plastic portion, said noncircular opening and the portion of said inner member cooperating therewith being of substantially uniform cross section along the axial extent thereof and slidingly cooperable for relative telescoping movement.

5. A torque transmitting slip connection comprising in combination, an outer tubular member having an axially extending opening therein bounded by the inner surface of said member, an axially extending inner member disposed in said opening with the external surface thereof being radially spaced from the internal surface of said outer member and adapted to telescope axially relative thereto, a plastic portion made of urethane plastic and disposed radially between said inner and outer members and having a Shore type D durometer hardness in the range of 65 to 90, a minimum tensile strength of about 5000 p.s.i. and a coefficient of friction less than about 0.51, said plastic portion being formed with internal and external peripheries closely conforming to said internal and external surfaces respectively, means securing one of the peripheries of said plastic portion to the one of said surfaces conforming thereto against relative axial and rotative movement for transmitting torque therebetween, the other periphery of said plastic portion and the one of said surfaces conforming thereto being of substantially axially uniform noncircular cross section for transmitting torque and allowing relative telescoping therebetween.

6. A torque transmitting slip connection for a driveline comprising in combination, an outer axially elongated cylindrical portion having an axially elongated opening therein, and axially elongated urethane plastic portion having a Shore type D durometer hardness in the range of 65 to 90 and a minimum tensile strength of about 5000 p.s.i. disposed within the opening in said outer portion and having an outer and inner end and with substantially the entire axial extent of said plastic portion being disposed within and circumferentially surrounded by said outer portion, means bonding said plastic portion to said outer portion against relative axial and rotative movement such that torsional loads may be transferred therebetween while said outer portion surrounding said plastic portion inhibits the same from deforming in a radially outward direction, said plastic portion having an elongated axially extending splined opening therein, and an inner axially elongated member having at least a first segment thereof disposed in said splined opening and a second segment thereof extending axially from said first segment, said first segment having a splined periphery closely conforming to said splined opening and axially slidingly cooperable therewith for transmitting torque to said plastic portion and subjecting the splines of said plastic portion substantially entirely to shear type loads.

7. A slip connection according to claim 6 wherein the minimum thickness of said plastic portion is .020 inch and the maximum thickness of said plastic portion is in a ratio of 5:1 with respect to said minimum thickness.

8. A slip connection according to claim 6 wherein said urethane plastic portion is filled with a filler from a group consisting of Teflon, graphite, fiberglass and molybdenum disulfide, the contents and particle size of the filler being such that the uncured liquid plastic is castable.

9. A slip connection according to claim 6 wherein said inner member projects from the outer end of the opening in said plastic portion and in telescoping relative to said plastic portion does not extend beyond the inner end thereof, and a portion of urethane plastic formed integrally with said plastic portion seals the inner end of said opening.

10. A torque transmitting slip connection for a driveline comprising in combination an outer member having an axially extending opening therein and an axial outer end, a urethane plastic member having a Shore type D durometer hardness in the range of 65 to 90 and a minimum tensile strength of about 5000 p.s.i. and having first and second integrally connected portions with said first portion being disposed within the opening in said outer member and said second portion extending from the outer end of said outer member and projecting axially and radially outwardly with respect thereto and axially abutting the outer end thereof, the outer periphery of said first portion of said plastic member conforming to the inner surface of said outer member, securing means in addition to the abutment between said plastic member and the outer end of said outer member securing said plastic member to said outer member against relative axial and rotative movement such that torsional loads may be transmitted therebetween, said plastic member having an axially extending noncircular opening therein, and an inner axially elongated member having at least a portion thereof disposed in said noncircular opening and axially slidingly cooperable with and closely conforming thereto in a torque transmitting relationship for telescoping movement relative to said plastic portion and transmitting torque thereto.

11. A torque transmitting slip connection adapted for use in conjunction with a housing rotatable relative thereto and having an internal bearing surface which is circular when viewed in cross section and disposed coaxially with the axis of the slip connection comprising in combination an outer member having an axially extending opening therein and an axially outer end, a plastic member made from a low friction plastic having high abrasion and impact resistance, said plastic member having first and second integrally connected portions with said first portion being disposed within the opening in said outer member and said second portion extending axially from the outer end of said outer member and projecting radially outwardly with respect thereto and abutting the outer end thereof, said second portion extending radially outwardly beyond the external periphery of said outer member and having a circular external periphery formed coaxially with the axis of said slip connection and slidably engageable with the bearing surface of the housing, the outer periphery of said first portion of said plastic member conforming to the inner surface of said outer member, means in addition to the abutment between said plastic member and the outer end of said outer member securing said plastic member to said outer member against relative axial and rotative movement such that torsional loads may be transmitted therebetween, said plastic member having an axially extending noncircular opening therein, and an inner axially elongated member having at least a portion thereof disposed in said noncircular opening and axially slidingly cooperable with and closely conforming thereto in a torque transferring relationship for telescoping movement relative to said palstic portion and transmitting torque thereto.

12. A slip connection according to claim 11 wherein securing means comprises circumferential and axial abutment means carried by said outer member and engaging said plastic member.

13. A slip connection according to claim 11 wherein said securing means comprises bonding means bonding said plastic member to said outer member.

14. A torque transferring slip connection comprising in combination a tubular outer member having an axially elongated opening therein which when viewed in cross section is noncircular, an axially elongated inner member having at least a portion thereof disposed in said opening and radially spaced from said outer member, at least said portion of said inner member having a noncircular configuration when viewed in cross section which is substantially uniform throughout the axial length thereof, a plastic portion made from urethane having a Shore type D durometer hardness in the range of 65 to 90 and a minimum tensile strength of about 5000 p.s.i. and being disposed radially intermediate said inner and outer members and having an external surface closely conforming to the internal surface of said outer member and an internal surface closely conforming to the exterior surface of said inner member whereby said plastic portion is adapted to transmit torque between said inner and outer members, one of said members having a pair of oppositely facing axial abutment means thereon axially abuttingly engaging said plastic portion and inhibiting the same from moving axially relative to said one member whereby said one member and said plastic portion move unitarily relative to the other of said members.

15. A torque transferring slip connection comprising in combination an axially elongated tubular outer member having an axially extending elongated opening therein open at the axially outer end of said outer member, said member having portions thereof deformed radially inwardly so as to form circumferential and axial abutment means therewithin, an axially elongated urethane plastic portion disposed within the opening in said outer member and closely conforming to and circumferentially surrounded thereby and engaging said abutment means whereby said abutment means inhibits relative rotation and axial movement between said outer member and plastic portion, said plastic portion having an elongated axially extending noncircular opening therein, and an inner axially elongated member having at least a portion thereof disposed in said noncircular opening and closely conforming thereto in a torque transferring and axially sliding relationship for telescoping movement relative to said plastic portion and transmitting torque thereto.

16. A torque transferring slip connection comprising in combination a tubular outer member having an axially elongated opening therein, an axially elongated portion of said outer member being deformed radially inwardly with respect to the remainder of said outer member so that the internal surface of said portion has a noncircular configuration when viewed in cross section and at least one first abutting surface is formed at an axial end of said portion adjacent the remainder of said outer member which surface faces axially toward the adjacent remainder of said outer member, a second axial abutting surface formed at the opposite axial end of said portion, said second surface extending radially with respect to the internal surface of said portion and facing axially oppositely with respect to said first abutting surface, an axially elongated urethane member disposed within the opening in said portion and closely conforming to and engaging the internal surface thereof whereby the noncircular configuration of said internal surface and the conforming surface of said urethane member inhibits relative rotation therebetween and said portion inhibits the external periphery of said urethane member from deforming in a radially outward direction, said urethane member extending axially sufficiently to abuttingly engage said first and second axial abutting surfaces whereby relative axial movement between said members is inhibited, said plastic member having an elongated axially extending opening therein which is noncircular when viewed in cross section and substantially uniform throughout the axial length thereof, and an inner axially elongated member having at least a portion thereof disposed in said noncircular opening in said plastic portion and closely conforming thereto in a torque transferring and sliding relationship for telescoping movement relative to said plastic member and transmitting torque thereto.

17. A slip connection according to claim 16 wherein the noncircular opening in said urethane member adjacent an end thereof is smaller in cross sectional area than the portion of said noncircular opening intermediate the ends of said urethane member and provides an interference fit sealing engagement with said inner member.

18. A torque transferring slip connection comprising in combination a tubular outer member including coaxial first and second segments, said first segment having axially outer and inner ends with the inner end thereof joined to said second segment, said segments each having an axial extending opening therein with the openings being disposed in a coaxial and adjoining relationship and the opening in said first segment being noncircular in cross section, the cross sectional area of the opening in said first segment at least at the location where it adjoins the opening in said second segment being smaller in cross sectional area than the cross sectional area of the adjoining portion of the opening in said second segment whereby an axially inwardly facing abutment means is formed on the inner surface of said outer member between said first and second openings, an axially elongated plastic portion disposed within the opening in said first segment and closely conforming to and circumferentially surrounded by said first segment, whereby the internal surfaces of said outer member bounding said noncircular opening inhibits relative rotation therebetween, said plastic portion extending axially inward of the inner end of said first segment and closely conforming to said inwardly facing abutment means for inhibiting axial outward movement of said plastic portion relative to said first segment, said plastic portion also extending from the outer end of said first segment and abutting the axial outer end thereof for inhibiting axial inward movement of said plastic portion relative to said first segment, said plastic portion having an elongated axially extending noncircular opening therein, and an inner axially elongated member having at least a portion thereof disposed in said noncircular opening and closely conforming thereto in a torque transferring and axially sliding relationship for telescoping movement relative to said plastic portion and transmitting torque thereto.

19. A slip connection according to claim 18 wherein the noncircular opening in said plastic portion extending from the outer end of said first segment is smaller in cross sectional area than the remainder of the noncircular opening in said plastic portion and sealingly engages said inner member in an interference fit relationship.

20. A slip connection according to claim 18 wherein the portion of said plastic portion which extends from the outer end of said first segment projects radially beyond the periphery thereof.

21. A slip connection according to claim 18 wherein said plastic portion comprises urethane characterized by having a high heat deflection temperature, high abrasion and impact resistance, high tensile strength, relatively low coefficient of friction and a Shore type D durometer hardness in the range of 65 to 90.

22. A slip connection according to claim 18 wherein said plastic portion comprises urethane filled with a stiffening filler, the contents and particle size of said filler being such that the uncured liquid plastic is castable and the cured plastic has a Shore type D durometer hardness in the range of 65 to 90 and a minimum tensile strength of about 5000 p.s.i.

23. A torque transmitting slip connection comprising in combination, an outer axially elongated portion having an elongated axially extending opening therein, an axially elongated urethane plastic portion having a Shore type D durometer hardness in the range of 65 to 90 and a minimum tensile strength of about 5000 p.s.i. disposed within the opening in said outer portion with a substantial portion of the plastic portion being disposed within and circumferentially surrounded by said outer portion, means securing said plastic portion to said outer portion against relative axial and rotative movement such that torsional loads may be transferred therebetween while said outer portion surrounding said plastic portion inhibits the external periphery of the plastic portion from deforming in a radially outward direction, said plastic portion having an elongated axially extending noncircular opening therein, an inner axially elongated member having at least a portion thereof disposed in said noncircular opening and axially slidingly cooperable with and closely conforming thereto in a torque transmitting relationship for telescoping movement relative to said plastic portion and transmitting torque thereto, and wherein said outer portion includes circumferentially and axially spaced circumferentially and axial abutting means, the periphery of said plastic portion is dimensioned so as to closely conform to the opening in said outer member and said abutting means axially and circumferentially abuts said plastic portion for inhibiting relative rotation and axial movement between said outer portion and said plastic portion.

24. A slip connection according to claim 23 wherein said abutment means includes at least a pair of circumferentially spaced circumferential abutting means and at least a pair of axially spaced axial abutting means, said circumferential abutting means circumferentially abuts said plastic portion for inhibiting relative rotation between said plastic and outer portions and said axial abutting means axially abuts said plastic portion for inhibiting relative axial movement between said plastic and outer portions.

25. A slip connection according to claim 24 wherein the opening in said outer portion is noncircular in cross section so that the internal wall of said outer member defining the opening therein comprises said circumferential abutment means.

References Cited

UNITED STATES PATENTS

| | | | |
|---|---|---|---|
| 2,199,926 | 5/1940 | Swennes | 64—23 |
| 2,908,150 | 10/1959 | Stern | 64—11 |
| 2,971,356 | 2/1961 | Reuter et al. | 64—27 |
| 2,994,213 | 8/1961 | Arnold et al. | 64—11 |
| 3,003,339 | 10/1961 | Haushalter | 64—11 |
| 3,055,195 | 9/1962 | Olson | 64—11 |
| 3,066,503 | 12/1962 | Fleming et al. | 64—23 X |
| 2,198,654 | 4/1940 | Calkins et al. | 64—23 |
| 2,923,140 | 2/1960 | Weasler | 64—4 |
| 2,970,869 | 2/1961 | Thomas | 308—238 |
| 3,122,384 | 2/1964 | Luenberger | 308 |

HALL C. COE, *Primary Examiner.*